US008208557B2

(12) United States Patent
Lee et al.

(10) Patent No.: US 8,208,557 B2
(45) Date of Patent: Jun. 26, 2012

(54) VIDEO ENCODING AND DECODING METHOD AND APPARATUS USING WEIGHTED PREDICTION

(75) Inventors: Tammy Lee, Seoul (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1057 days.

(21) Appl. No.: 12/132,637

(22) Filed: Jun. 4, 2008

(65) Prior Publication Data

US 2009/0034854 A1 Feb. 5, 2009

(30) Foreign Application Priority Data

Jul. 31, 2007 (KR) ........................ 10-2007-0077164

(51) Int. Cl.
*H04N 7/12* (2006.01)
(52) U.S. Cl. .............................. 375/240.24; 375/240.01
(58) Field of Classification Search ............. 375/240.01, 375/240.12, 240.16, 240.24
See application file for complete search history.

(56) References Cited

U.S. PATENT DOCUMENTS

| 5,502,494 | A | * | 3/1996 | Auld | 375/240.25 |
| 6,078,617 | A | * | 6/2000 | Nakagawa et al. | 375/240 |
| 6,157,396 | A | * | 12/2000 | Margulis et al. | 345/506 |
| 2005/0281334 | A1 | | 12/2005 | Walker et al. | |
| 2006/0146932 | A1 | | 7/2006 | Panusopone et al. | |
| 2006/0268166 | A1 | | 11/2006 | Bossen et al. | |
| 2007/0098067 | A1 | * | 5/2007 | Kim et al. | 375/240.08 |
| 2008/0107178 | A1 | * | 5/2008 | Han et al. | 375/240.15 |
| 2010/0266042 | A1 | * | 10/2010 | Koo et al. | 375/240.16 |

FOREIGN PATENT DOCUMENTS

| JP | 9-130748 A | 5/1997 |
| KR | 10-0178231 B1 | 11/1998 |

* cited by examiner

*Primary Examiner* — Brenda H Pham
(74) *Attorney, Agent, or Firm* — Sughrue Mion, PLLC

(57) ABSTRACT

Provided is a video encoding and decoding method and apparatus. The video encoding method includes selecting a plurality of reference blocks based on a plurality of motion vectors and setting weights assigned to the plurality of reference blocks independently for each of a plurality of regions of a current block in order to predict and encode the current block, thereby providing a new encoding mode allowing accurate prediction of the current block and thus improving the compression rate of video encoding.

6 Claims, 11 Drawing Sheets

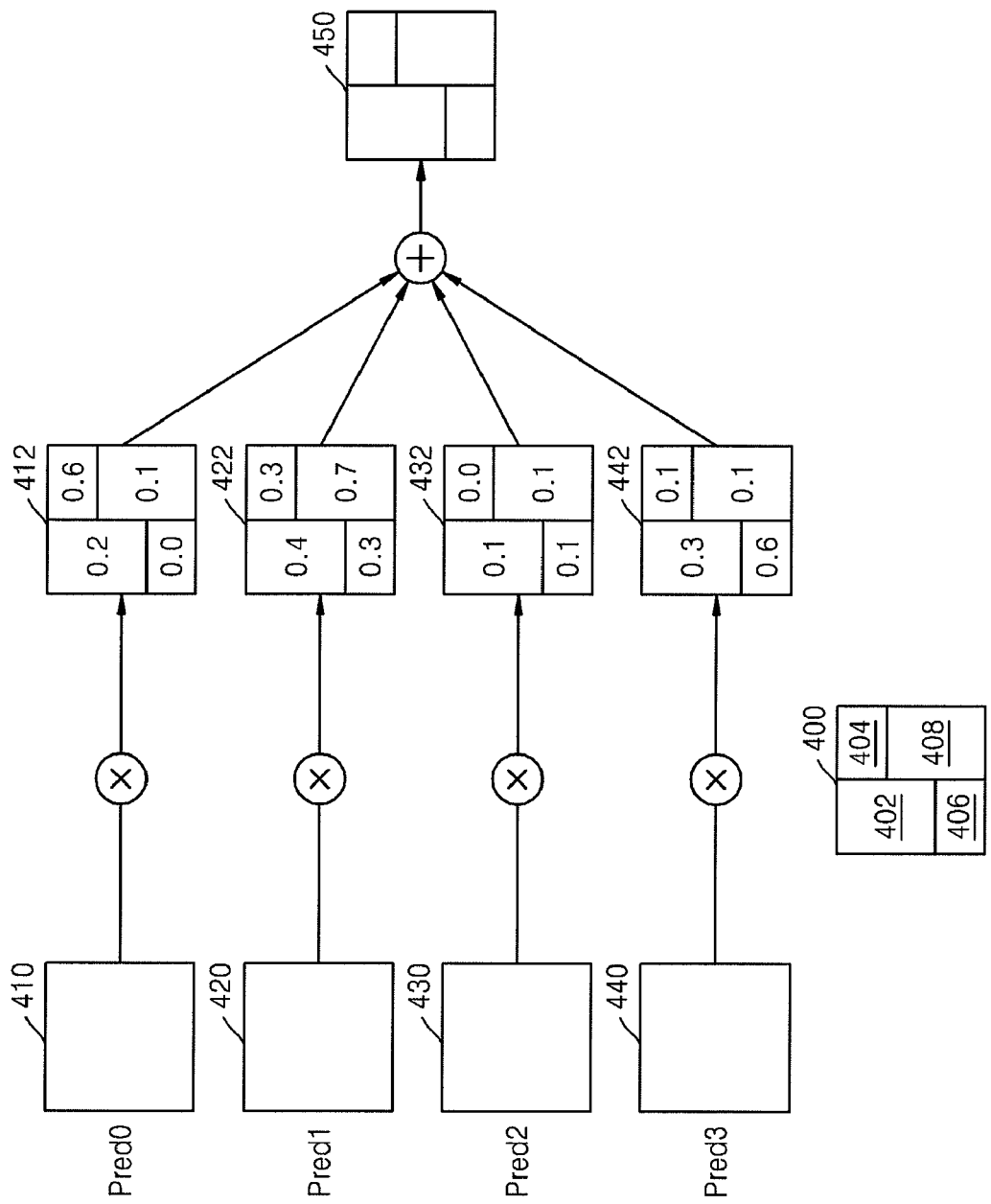

VIDEO ENCODING AND DECODING METHOD AND APPARATUS USING WEIGHTED PREDICTION

CROSS-REFERENCE TO RELATED PATENT APPLICATION

This application claims priority from Korean Patent Application No. 10-2007-0077164, filed on Jul. 31, 2007, in the Korean Intellectual Property Office, the disclosure of which is incorporated herein in its entirety by reference.

BACKGROUND OF THE INVENTION

1. Field of the Invention

Apparatuses and methods consistent with the present invention generally relate to video encoding and decoding, and more particularly, to video encoding and decoding in which a current block can be accurately predicted using weighted prediction and an image is encoded and decoded based on the prediction result.

2. Description of the Related Art

In video compression standards such as Moving Picture Experts Group (MPEG-1), MPEG-2, and H.264/MPEG-4 Advanced Video Coding (AVC), a picture is divided into macroblocks for video encoding. Each of the macroblocks is then encoded using interprediction or intraprediction.

Video encoding using interprediction involves video compression by means of removal of temporal redundancy between pictures and a representative example thereof is motion estimation encoding. In motion estimation encoding, motion of a current picture is estimated and compensated for in block units using at least one reference picture for video encoding.

In motion estimation encoding, a block that is most similar to the current block is searched for in a predetermined search range of at least one reference picture using a predetermined evaluation function. Once the similar block is found, only a residual block between the current block and the found block is transmitted, thereby improving the data compression rate. Blocks of various sizes such as 16×16, 8×16, 8×8, or the like can be used in motion estimation encoding.

For interprediction, H.264/AVC provides a prediction mode called weighted prediction. This prediction mode is usually used to predict the brightness of an image. For an image whose brightness changes over time such as when the image fades in or fades out, image encoding having no consideration regarding the brightness of the image may lead to significant degradation in the display quality of the image. Thus, H.264/AVC provides a method of performing prediction by adaptively weighting a reference picture.

FIG. 1 illustrates an example of weighted prediction according to the related art.

Referring to FIG. 1, it is assumed that a current picture 110 is a bidirectional (B) picture and is interpredicted using two reference pictures #0 120 and #1 130. To predict a current block 112 included in the current picture 110, two reference blocks 122 and 132 corresponding to the current block 112 are selected from the reference pictures 120 and 130, respectively. A block that is most similar to the current block 112 is selected using a predetermined evaluation function.

Two motion vectors $MV_0$ and $MV_1$ are estimated for interprediction of the current block 112. The current block 112 is then predicted using weighted prediction.

Weights are calculated based on temporal distances between the current picture 110 and the reference pictures 120 and 130. A weight $W_1$ assigned to the reference picture 130 is calculated by $W_1 = tb/td$, where tb is the temporal distance between the reference picture 120 and the current picture 110, and td is the temporal distance between the reference picture 120 and the reference picture 130. A weight $W_0$ assigned to the reference picture 120 is calculated by $W_0 = 1 - W_1$.

Once the weights are assigned to the reference pictures 120 and 130, a prediction block P of the current block 112 is obtained by $P = W_0 * R_0 + W_1 * R_1 + D$. $R_0$ indicates the reference block 122 corresponding to the current block 112, which is included in the reference picture 120, $R_1$ indicates the reference block 132 corresponding to the current block 112, which is included in the reference picture 130, and D is an offset that may be '0'.

When the weights are calculated based on temporal distances between the current picture 110 and the reference pictures 120 and 130 as illustrated in FIG. 1, it is not necessary to separately encode the weights used in prediction of the current block 112, which is called an implicit mode. On the other hand, when the weights are set at random instead of being calculated based on the temporal distances, the weights used in prediction of the current block 112 have to be separately encoded, which is called an explicit mode.

In weighted prediction illustrated in FIG. 1, however, since the particular weights $W_0$ and $W_1$ are assigned for the reference blocks 122 and 132, the accuracy of predicting each block included in the current picture 110 degrades.

SUMMARY OF THE INVENTION

The present invention provides a video encoding and decoding method and apparatus in which weighted prediction can be accurately performed during prediction-encoding and decoding of an image, and a computer-readable recording medium having recorded thereon a program for executing the video encoding and decoding method.

According to an aspect of the present invention, there is provided a video encoding method including estimating a plurality of motion vectors required for interprediction of a current block and selecting a plurality of reference blocks based on the plurality of estimated motion vectors, dividing the current block into a plurality of regions and setting weights assigned to the plurality of reference blocks for interprediction independently for each of the regions, predicting the current block from the plurality of reference blocks based on the setting result, and encoding the current block based on the prediction result.

The plurality of motion vectors may be motion vectors for a plurality of sub-blocks included in the current block, and each of the reference blocks may have the same size as that of the current block.

The plurality of motion vectors may be motion vectors for bi-predictive prediction of the current block, and each of the reference blocks may have the same size as that of the current block.

The encoding of the current block may have encoding information about the plurality of regions and information about the set weights.

According to another aspect of the present invention, there is provided a video encoding apparatus including a motion estimation unit, a motion compensation unit, and an encoding unit. The motion estimation unit estimates a plurality of motion vectors required for interprediction of a current block and selects a plurality of reference blocks based on the plurality of estimated motion vectors. The motion compensation unit divides the current block into a plurality of regions and sets weights assigned to the plurality of reference blocks for interprediction independently for each of the regions and predicting the current block from the plurality of reference blocks based on the setting result. The encoding unit encodes the current block based on the prediction result.

The encoding unit may encode information about the plurality of regions and information about the set weights.

According to another aspect of the present invention, there is provided a video decoding method including receiving a bitstream including data about a residual block of a current block, extracting the data about the residual block, information about a plurality of motion vectors required for interprediction of the current block, information about a plurality of regions obtained by dividing the current block for the interprediction, and information about weights set independently for each of the regions from the received bitstream, predicting the plurality of regions using the information about the weights and a plurality of reference blocks selected based on the information about the plurality of motion vectors, and reconstructing the current block based on the prediction result and the data about the residual block.

According to another aspect of the present invention, there is provided a video decoding apparatus including a decoding unit, a motion compensation unit, and a reconstruction unit. The decoding unit receives a bitstream including data about a residual block of a current block and extracts the data about the residual block, information about a plurality of motion vectors required for interprediction of the current block, information about a plurality of regions obtained by dividing the current block for the interprediction, and information about weights set independently for each of the regions from the received bitstream. The motion compensation unit predicts the plurality of regions using the information about the weights and a plurality of reference blocks selected based on the information about the plurality of motion vectors. The reconstruction unit reconstructs the current block based on the prediction result and the data about the residual block.

According to another aspect of the present invention, there is provided a computer-readable recording medium having recorded thereon a program for executing the video encoding and decoding method.

BRIEF DESCRIPTION OF THE DRAWINGS

The above and other aspects of the present invention will become more apparent by describing in detail exemplary embodiments thereof with reference to the attached drawings in which:

FIG. 4 is a diagram for explaining weight prediction according to an exemplary embodiment of the present invention;

DETAILED DESCRIPTION OF EXEMPLARY EMBODIMENTS OF THE INVENTION

Figure 1:
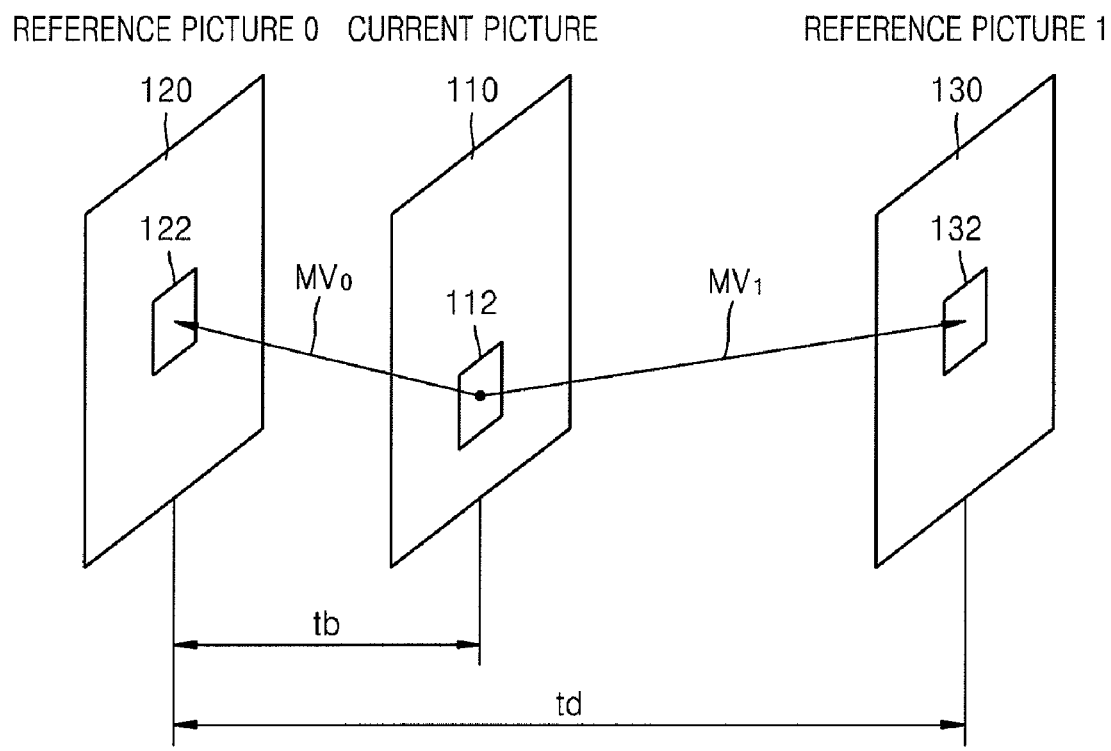
FIG. 1 illustrates an example of weighted prediction according to the related art.

Hereinafter, exemplary embodiments of the present invention will be described in detail with reference to the accompanying drawings. It should be noted that like reference numerals refer to like elements illustrated in one or more of the drawings. In the following description of the present invention, detailed description of known functions and configurations incorporated herein will be omitted for conciseness and clarity.

Figure 2:
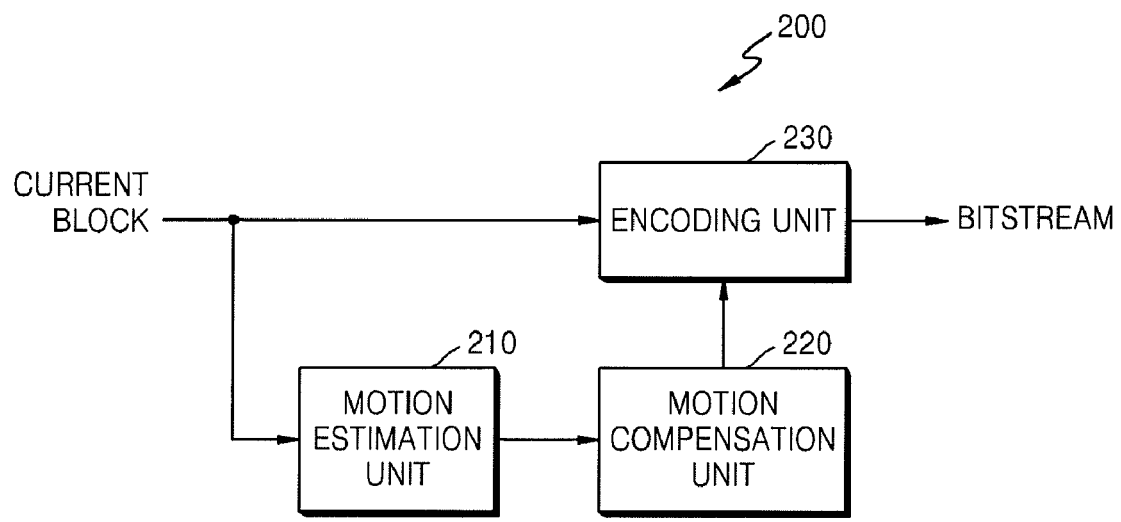
FIG. 2 is a block diagram of a video encoding apparatus according to an exemplary embodiment of the present invention.

FIG. 2 is a block diagram of a video encoding apparatus 200 according to an exemplary embodiment of the present invention.

Referring to FIG. 2, the video encoding apparatus 200 according to the exemplary embodiment of the present invention includes a motion estimation unit 210, a motion compensation unit 220, and an encoding unit 230.

The motion estimation unit 210 estimates a plurality of motion vectors required for interprediction of a current block and selects a plurality of reference blocks based on the estimated motion vectors. According to an exemplary embodiment of the present invention, the video encoding apparatus 200 performs interprediction by setting weights to be assigned to the plurality of reference blocks, which are different from region to region. To this end, the motion estimation unit 210 first estimates the plurality of motion vectors required for interprediction of the current block.

Although the plurality of motion vectors can be estimated in various ways, the plurality of motion vectors that help to predict the most approximate value for the current block using weighted prediction according to the present invention are calculated.

For example, it is assumed that the current block is divided into M regions and there are N combinations of weights assigned to the plurality of reference blocks referred to by the current block. Since N combinations of weights are available for each of the M regions, M×N combinations of weights can be used for interprediction of the current block. The plurality of motion vectors are estimated for each of the M×N combinations. Based on the estimation result, one of the M×N combinations and corresponding motion vectors in which a residual block between the current block and a prediction block thereof is smallest are selected.

To reduce the amount of calculation, an initial value may be set for the plurality of motion vectors and the optimal motion vector for each of the motion vectors may be estimated one-by-one. In this case, if the current block is estimated by two motion vectors $MV_0$ and $MV_1$, an initial value for the motion vectors $MV_0$ and $MV_1$ is set. The motion vector $MV_1$ is fixed to the initial value and the optimal motion vector $MV_0$ is estimated according to the M×N combinations described above. Next, the estimated optimal motion vector $MV_0$ is fixed to $MV_0$, and the optimal motion vector $MV_1$ is estimated according to the M×N combinations described above.

However, when the plurality of motion vectors are estimated according to various combinations of weights, the amount of calculation performed by the video encoding apparatus 200 increases, resulting in a reduction in encoding speed. Thus, the plurality of motion vectors required for prediction of the current block can also be estimated as illustrated in FIGS. 3A and 3B.

Figure 3A:
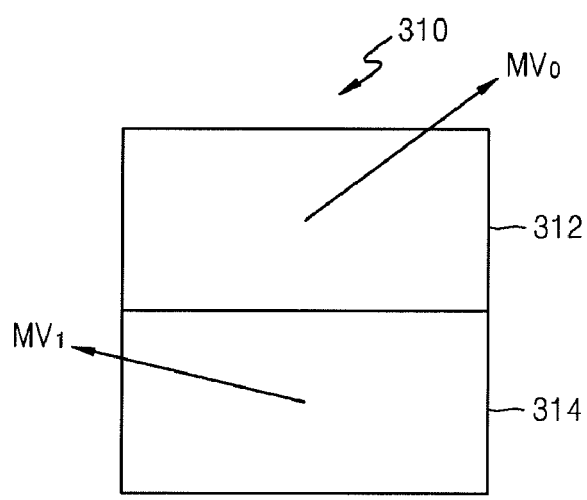
FIGS. 3A and 3B illustrate a plurality of motion vectors according to an exemplary embodiment of the present invention.
Figure 3B:
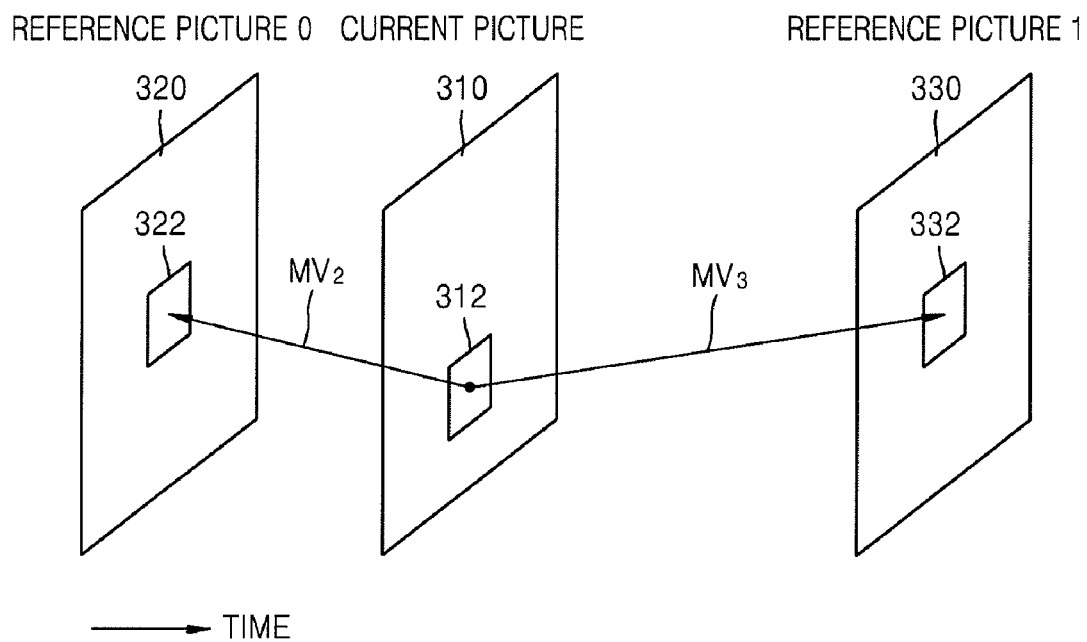

FIGS. 3A and 3B illustrate a plurality of motion vectors for a current block 310, according to an exemplary embodiment of the present invention.

Referring to FIG. 3A, the current block 310 includes sub-blocks 312 and 314. A motion vector is estimated for each of the sub-blocks 312 and 314 included in the current block 310, and the estimated motion vectors may be used as the plurality of motion vectors for the current block 310.

For example, the motion estimation unit 210 estimates a motion vector $MV_0$ for the sub-block 312 located in an upper portion of the current block 310. A block that is most similar to the sub-block 312 is searched for in at least one reference picture, and the motion vector $MV_0$ for the sub-block 312 is estimated according to the search result. Next, a motion vector $MV_1$ for the sub-block 314 located in a lower portion of the current block 310 is estimated by searching the at least one reference picture. The motion vectors $MV_0$ and $MV_1$ for the sub-blocks 312 and 314 serve as the plurality of motion vectors required for interprediction of the current block 310.

FIG. 3B is a diagram for explaining prediction of a current block 312 using bi-predictive prediction, according to an exemplary embodiment of the present invention.

In FIG. 3B, the current block 312 is predicted from blocks 322 and 332 included in a plurality of different pictures 320 and 330 that temporally precede or follow a current picture 310 similar to that as shown in FIG. 1. Referring to FIG. 3B, the current block 312 is predicted by referring to a plurality of reference blocks 322 and 332 included in the different pictures 320 and 330. The blocks 322 and 332 that are most similar to the current block 312 are searched for in the reference pictures 320 and 330, and the found blocks 322 and 332 are referred to. In this case, motion vectors $MV_0$ and $MV_1$ indicating the plurality of reference blocks 322 and 332 serve as a plurality of motion vectors required for interprediction of the current block 312.

Referring back to FIG. 2, after the motion estimation unit 210 estimates the plurality of motion vectors required for interprediction of the current block, the motion compensation unit 220 performs interprediction on the current block using the estimated motion vectors using weighted prediction according to an exemplary embodiment of the present invention.

In other words, the current block is divided into a plurality of regions and weights assigned to a plurality of reference blocks are set independently for each of the regions for interprediction of the current block, as will be described in detail with reference to FIG. 4.

FIG. 4 is a diagram for explaining weighted prediction according to an exemplary embodiment of the present invention.

In FIG. 4, weighted prediction is performed on the current block by referring to four different reference blocks.

Referring to FIG. 4, the motion compensation unit 220 divides the current block into a plurality of regions in order to set a weighting partition 400.

Upon selection of a plurality of reference pictures 410, 420, 430, and 440 to be used for prediction of the current block according to the plurality of motion vectors estimated by the motion estimation unit 210, the motion compensation unit 220 multiplies the reference pictures 410, 420, 430, and 440 with the weighting partition 400. At this time, weights for the reference pictures 410, 420, 430, and 440 are set independently for each of a plurality of weighting regions 402, 404, 406, and 408 included in the weighting partition 400.

For example, for the weighting region 402 located in a left upper portion of the weighting partition 400, a weight of 0.2 is set for the reference picture 410, a weight of 0.4 is set for the reference picture 420, a weight of 0.1 is set for the reference picture 430, and a weight of 0.3 is set for the reference picture 440.

The weights assigned to the reference pictures change from weighting region to weighting region, allowing flexible weighted prediction. Blocks 412, 422, 432, and 442 generated by the multiplication are summed up, thereby generating a prediction block 450 of the current block.

It can be easily known by those of ordinary skill in the art that a form in which the current block is divided into a plurality of regions by the motion compensation unit 220 is not limited to an example illustrated in FIG. 4. Representative examples for division of the current block will be described with reference to FIGS. 5A through 5D.

Weights assigned to the reference pictures 410, 420, 430, and 440 are not also limited to the example illustrated in FIG. 4. In particular, infinite decimal fractions between 0 and 1 may be used as the weights. Thus, weight information about the weights can be efficiently encoded by limiting the number of weights that can be set, as will be described later with reference to FIG. 6.

FIGS. 5A through 5D illustrate a plurality of weighting partitions according to an exemplary embodiment of the present invention.

In FIGS. 5A through 5D, the motion compensation unit 220 sets the weighting regions by dividing the current block for flexible weighted prediction.

Figure 5A:
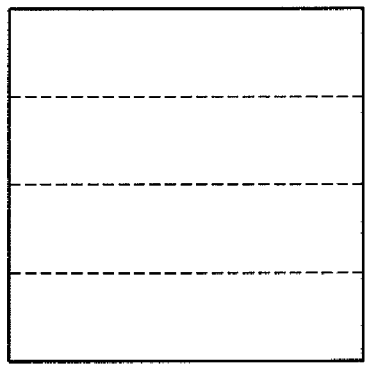
FIGS. 5A through 5D illustrate a plurality of weighting partitions according to an exemplary embodiment of the present invention.
Figure 5B:
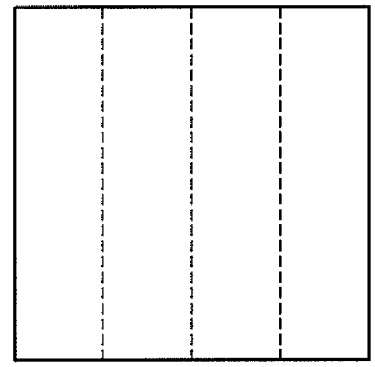
Figure 5C:
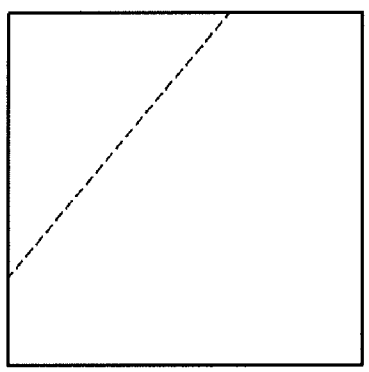
Figure 5D:
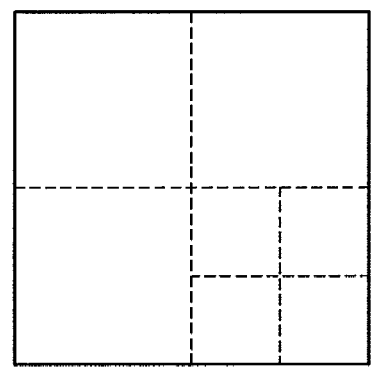

The current block is divided in a horizontal direction in FIG. 5A, the current block is divided in a vertical directions in FIG. 5B, and the current block is divided in an oblique direction in FIG. 5C. In FIG. 5D, the current block is hierarchically divided into regular squares as in conventional video encoding. However, it can be easily understood by those of ordinary skill in the art that the current block can be divided in various other ways for setting a weighting partition without being limited to the weighting partitions illustrated in FIGS. 5A through 5D.

Figure 6:
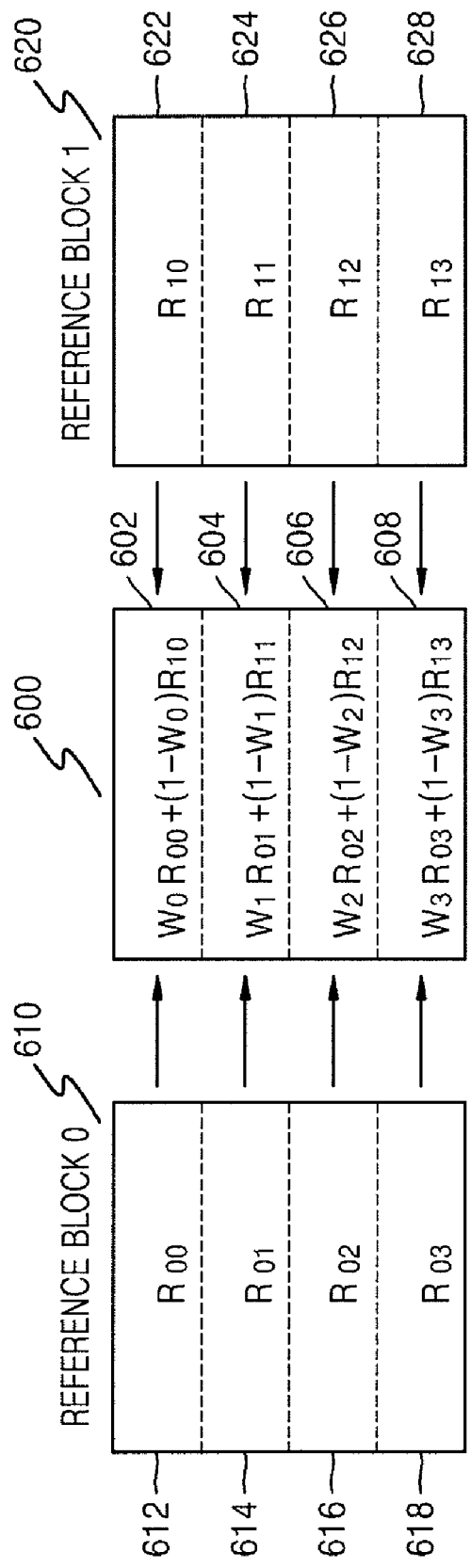
FIG. 6 is a diagram for explaining weight prediction according to another exemplary embodiment of the present invention.

FIG. 6 is a diagram for explaining weighted prediction according to another exemplary embodiment of the present invention.

In FIG. 6, the motion estimation unit 220 performs weighted prediction when a weighting partition is set as illustrated in FIG. 5A. In other words, the number of weighting regions of the weighting partition, i.e., $N_P$, is equal to 4, and the number of weight interval between 0 and 1, i.e., $N_W$, is equal to 3.

Referring to FIG. 6, when a current block 600 is interpredicted based on two reference blocks #0 610 and #1 620, weights assigned to the reference blocks 610 and 620 are set independently for each of a plurality of weighting regions 602, 604, 606, and 608. For example, a weight $W_0$ is assigned to the reference block 610 for the weighting region 602 located uppermost in the current block 600, a weight $W_1$ is assigned to the reference block 610 for the weighting region 604 located second from the top, a weight $W_2$ is assigned to the reference block 610 for the weighting region 606 located third from the top, and a weight $W_3$ is assigned to the reference block 610 for the weighting region 608 located lowermost in the current block 600. Similarly, weights of $(1-W_N)$ are assigned to the reference block 620 in descending order from the top of the current block 600. Here, N may be 0, 1, 2, and 3. Since only the two reference blocks 610 and 620 are used, upon determination of the weights $W_N$ for one of the reference blocks, the weights $(1-W_N)$ for the other reference block can also be determined.

For the number of weight interval $N_W=3$, $W_0$, $W_1$, $W_2$, $W_3 \in \{0, \frac{1}{3}, \frac{2}{3}, 1\}$. By setting the number of weight interval, weights that can be assigned are limited to 0, $\frac{1}{3}$, $\frac{2}{3}$, and 1.

Once the weights are assigned, the motion compensation unit 220 predicts the current block 600 according to the assigned weights. The weighting region 602 located uppermost in the current block 600 is predicted using corresponding regions of the reference blocks 610 and 620. When prediction values of the weighting regions 602, 604, 606, and 608 are $P_0$, $P_1$, $P_2$, and $P_3$, respectively, they can be set according to the assigned weights, as follows.

$$P_0 = W_0 R_{00} + (1-W_0) R_{10}$$

$$P_1 = W_1 R_{01} + (1-W_1) R_{11}$$

$$P_2 = W_2 R_{02} + (1-W_2) R_{12}$$

$$P_3 = W_3 R_{03} + (1-W_3) R_{13}$$

However, it can be easily understood by those of ordinary skill in the art that the current block 600 can also be predicted by adding a predetermined offset value DN to $P_0$, $P_1$, $P_2$, and $P_3$. Here, N may be 0, 1, 2, and 3.

The encoding unit 230 encodes the current block based on the prediction result obtained by the motion compensation unit 220. Once a prediction block of the current block is generated by prediction of the motion compensation unit 220, the encoding unit 230 generates a residual block by subtracting the prediction block from the current block. The encoding unit 230 then performs a Discrete Cosine Transform (DCT) on the residual block and quantizes coefficients resulting from the DCT. The encoding unit 230 performs entropy-coding on the quantized coefficients, thereby generating a bitstream. During encoding, the encoding unit 230 also encodes weighting partition information and weight information and inserts the encoded information into the bitstream.

The weighting partition information indicates how the current block is divided into a plurality of regions and the weight information indicates weights assigned to reference blocks, which are set independently for each of the regions.

When the current block is divided into regions of the same size as illustrated in FIGS. 5A and 5B, only information about a dividing direction (a horizontal direction or a vertical direction) and the number of regions are encoded as the weighting partition information and a decoding side can perform decoding by referring to the weighting partition information.

However, when weighted prediction has been performed on the current block divided in an arbitrary direction as illustrated in FIG. 5C, the decoding side cannot perform weighted prediction on the current block by using only the information including the dividing direction and the number of regions. Thus, it is necessary to encode the weight partition information in another way, as will be described in detail with reference to FIGS. 7A through 7C.

Figure 7A:
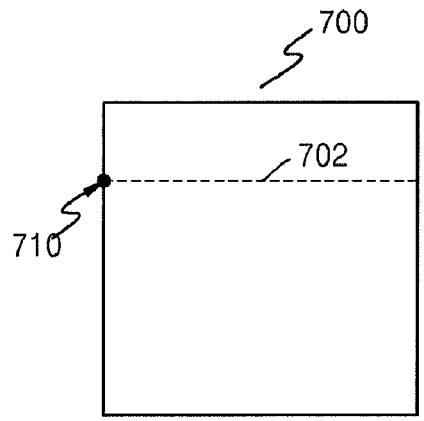
FIGS. 7A through 7C illustrate cutting points according to an exemplary embodiment of the present invention.
Figure 7B:
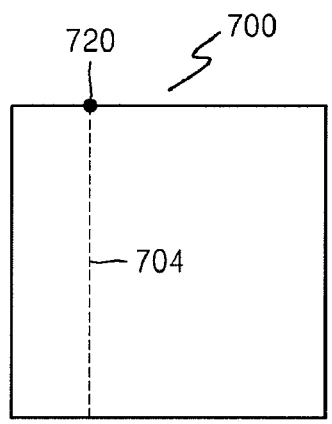
Figure 7C:
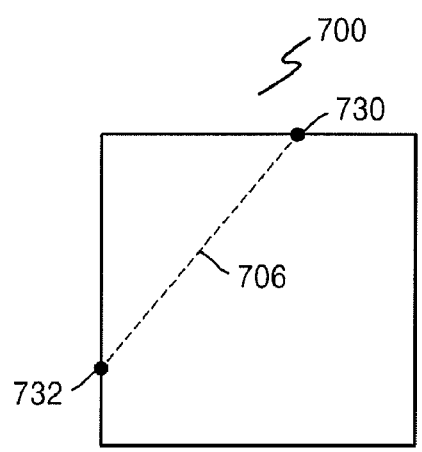

FIGS. 7A through 7C illustrate cutting points according to an exemplary embodiment of the present invention.

When a current block 700 is divided into regions of different sizes for weighted prediction as illustrated in FIGS. 7A and 7B, a decoding side cannot accurately specify a way to divide the current block 700 by using only information about a dividing direction (a horizontal direction or a vertical direction) and the number of regions. Thus, in this case, the encoding unit 230 also encodes information about the dividing shape. For example, a cutting point according to the boundary of a region, i.e., information about vertical coordinates 710 or horizontal coordinates 720 at which a boundary 702 or 704 of a region intersects a boundary of the current block 700, is encoded and then inserted into a bitstream.

When the current block 700 is divided in an arbitrary direction instead of the horizontal or vertical direction, information about horizontal coordinates 730 and vertical coordinates 732 at which a boundary 706 of a region intersects the boundary of the current block 700 is encoded and then inserted into a bitstream.

Figure 8:
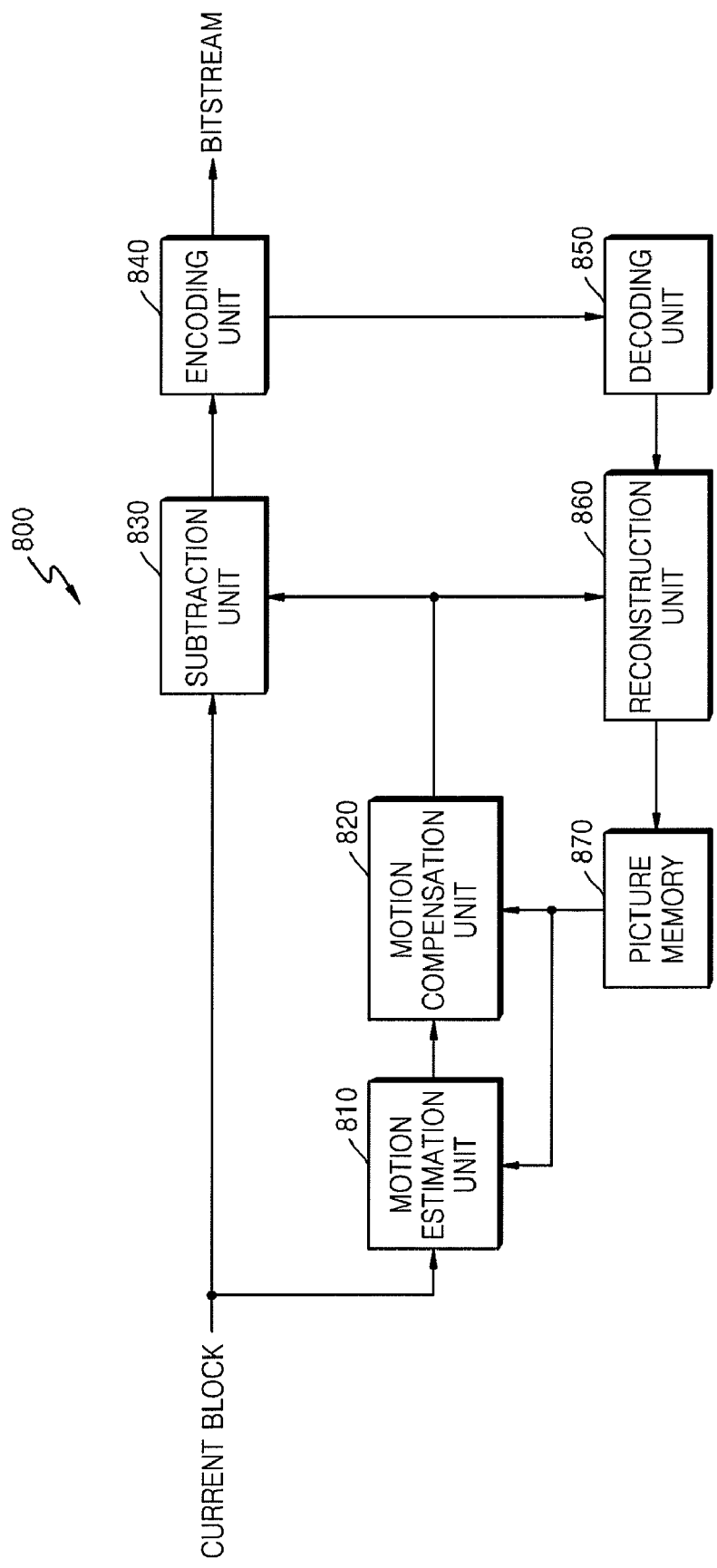
FIG. 8 is a block diagram of a video encoding apparatus according to another exemplary embodiment of the present invention.

FIG. 8 is a block diagram of a video encoding apparatus 800 according to another exemplary embodiment of the present invention.

Referring to FIG. 8, the video encoding apparatus 800 according to the exemplary embodiment of the present invention includes a motion estimation unit 810, a motion compensation unit 820, a subtraction unit 830, an encoding unit 840, a decoding unit 850, a reconstruction unit 860, and a picture memory 870.

The motion estimation unit 810 searches reference pictures stored in the picture memory 870 in order to estimate a plurality of motion vectors required for interprediction of a current block. The motion estimation unit 810 estimates a plurality of motion vectors that help to predict the most approximate value for the current block by searching the reference pictures when weighted prediction according to the present invention is performed.

The motion estimation unit 810 may also estimate a motion vector for each sub-block included in the current block and use the estimated motion vectors as motion vectors required for interprediction of the current block as in the prior art. In this case, the motion estimation unit 810 searches in a reference picture for a block that is most similar to each sub-block and estimates the motion vector for each sub-block.

The motion estimation unit 810 may also estimate the motion vectors for the current block using bi-predictive prediction. Reference blocks corresponding to the current block are selected by searching a plurality of different pictures that temporally precede or follow the current block, thereby estimating the motion vectors for the current block.

The motion compensation unit 820 interpredicts the current block using the plurality of motion vectors estimated by the motion estimation unit 810. In other words, the motion compensation unit 820 interpredicts the current block using flexible weighted prediction described above with reference to FIGS. 4 and 6.

The subtraction unit 830 subtracts a prediction block generated by interprediction of the motion compensation unit 820 from the current block, thereby generating a residual block.

The encoding unit 840 encodes the residual block generated by the subtraction unit 830. More specifically, the encoding unit 840 performs DCT on the residual block in order to generate DCT coefficients and quantizes the generated DCT coefficients. The encoding unit 840 then performs entropy-coding on the quantized DCT coefficients, thereby generating a bitstream.

The decoding unit 850 decodes the residual block encoded by the encoding unit 840, thereby reconstructing the residual block. More specifically, the decoding unit 850 performs inverse quantization and inverse DCT on the encoded residual block, thereby reconstructing the residual block.

The reconstruction unit 860 adds the prediction block generated by the motion compensation unit 820 to the residual block reconstructed by the decoding unit 850, thereby reconstructing the current block. The reconstructed current block is stored in the picture memory 870 for use in prediction of a next block or a next picture.

Figure 9:
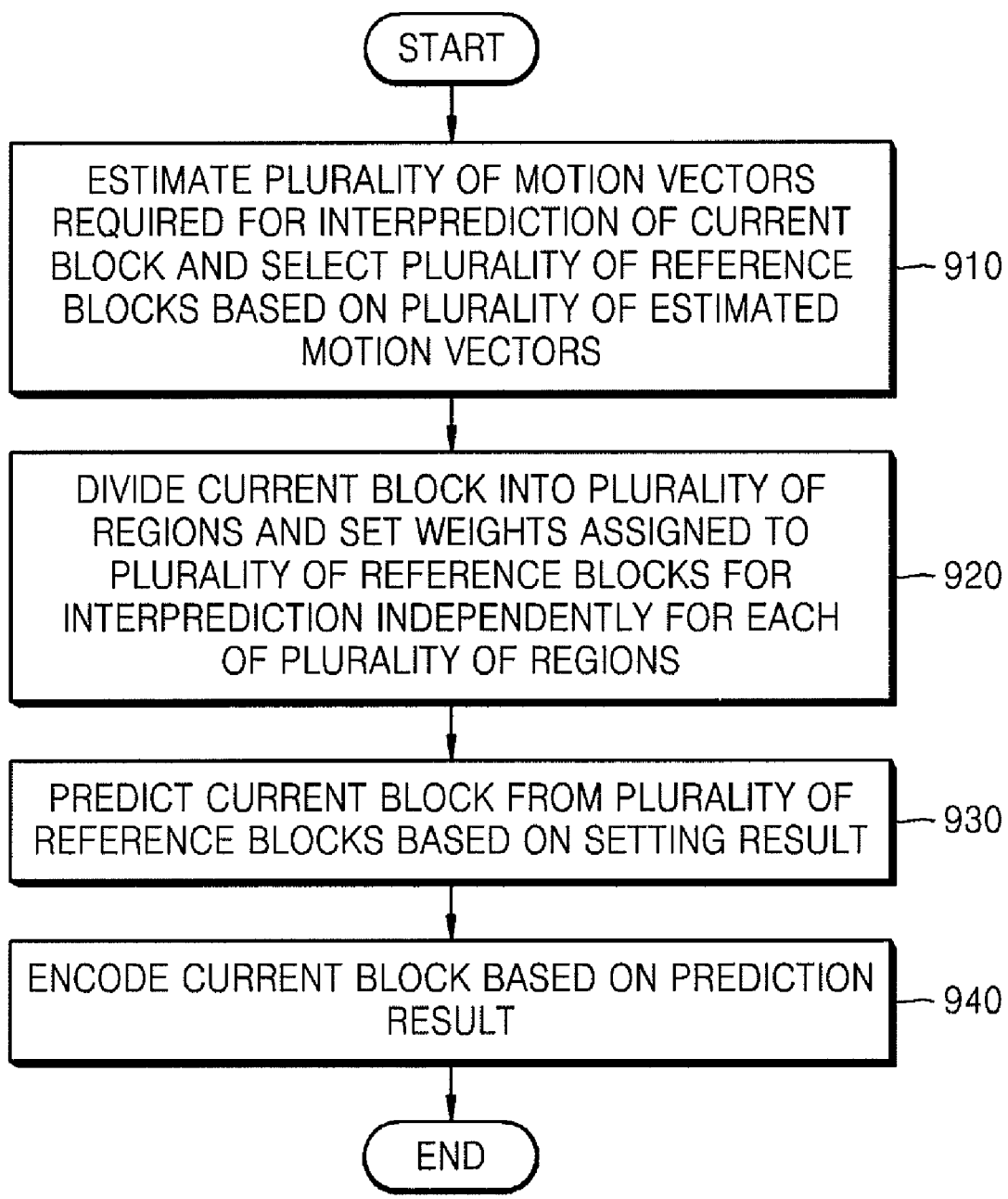
FIG. 9 is a flowchart of a video encoding method according to an exemplary embodiment of the present invention.

FIG. 9 is a flowchart of a video encoding method according to an exemplary embodiment of the present invention.

In operation 910, a video encoding apparatus estimates a plurality of motion vectors required for interprediction of a current block and selects a plurality of reference blocks based on the estimated motion vectors. As mentioned previously, there is no limit to a way of estimating the plurality of motion vectors, and motion vectors that guarantee the best performance of prediction for the current block using flexible weighted prediction may be estimated or motion vector estimation according to the related art may be used. When motion vector estimation according to the related art is used, motion vectors for sub-blocks included in the current block may be used as the motion vectors for the current block, or the motion vectors for the current block may be estimated by searching pictures that temporally precede or follow the current block using bi-predictive prediction.

In operation 920, the video encoding apparatus divides the current block into a plurality of regions and sets weights assigned to the selected reference blocks independently for each of the regions.

In operation 930, the video encoding apparatus predicts the current block from the plurality of reference blocks based on the setting result of operation 920. As discussed above with reference to FIGS. 4 and 6, weighted prediction is performed using different weight combinations for different regions of the current block, thereby accurately predicting the current block.

In operation 940, the video encoding apparatus encodes the current block based on the prediction result of operation 930. A prediction block generated by the prediction is subtracted from the current block, thereby generating a residual block. DCT is performed on the generated residual block, thereby generating DCT coefficients. The generated DCT coefficients are quantized and entropy-coded, and then inserted into a bitstream.

Figure 10:
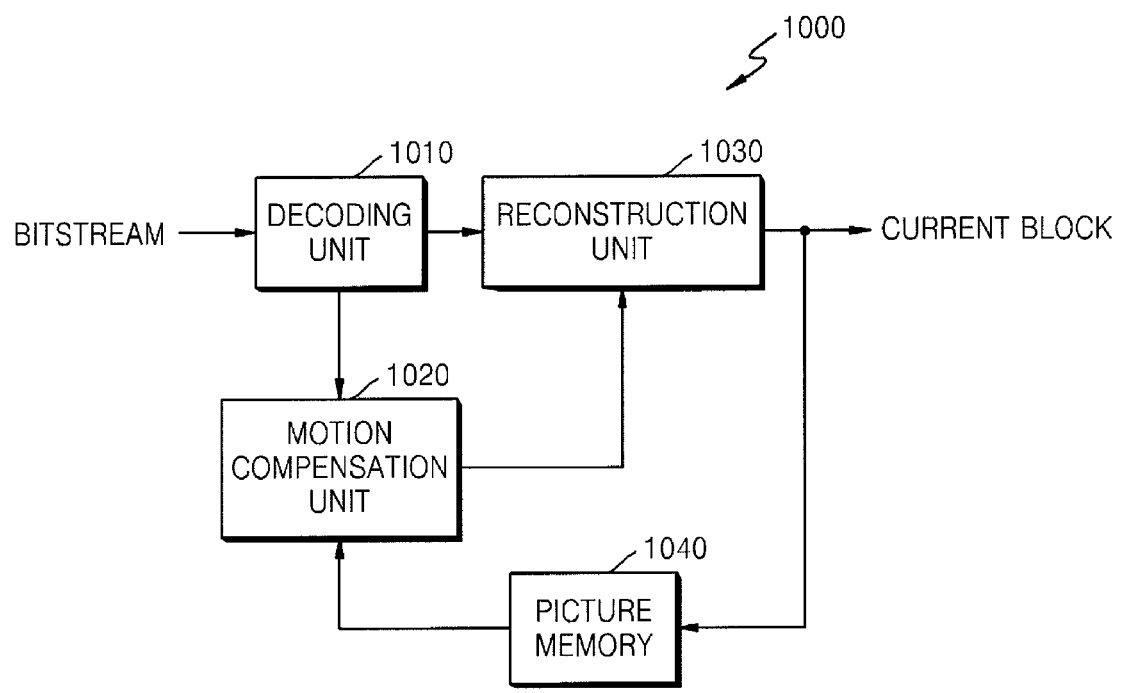
FIG. 10 is a block diagram of a video decoding apparatus according to an exemplary embodiment of the present invention.

FIG. 10 is a block diagram of a video decoding apparatus 1000 according to an exemplary embodiment of the present invention.

Referring to FIG. 10, the video decoding apparatus 1000 according to the exemplary embodiment of the present invention includes a decoding unit 1010, a motion compensation unit 1020, a reconstruction unit 1030, and a picture memory 1040.

The decoding unit 1010 receives a bitstream including data about a residual block of a current block. The decoding unit 1010 extracts the data about the residual block, information about a plurality of motion vectors required for prediction of the current block, information about a weighting partition including a plurality of regions for weighted prediction of the current block, and information about weights set independently for each of the regions from the received bitstream.

The decoding unit 1010 performs entropy-decoding and inverse quantization on the extracted data about the residual block, thereby generating DCT coefficients. The decoding unit 1010 performs inverse DCT on the generated DCT coefficients, thereby reconstructing a residual block.

Information about a weighting partition including the plurality of regions may indicate the number of regions as described regarding the encoding unit 230 or a cutting point at which the boundary of a region intersects the boundary of the current block as described with reference to FIGS. 7A and 7B.

The motion compensation unit 1020 interpredicts the current block based on the data extracted by the decoding unit 1010. The motion compensation unit 1020 performs flexible weighted prediction described above with reference to FIGS. 4 and 6.

The motion compensation unit 1020 searches reference pictures stored in the picture memory 1040 based on the plurality of motion vectors extracted by the decoding unit 1010 and selects a plurality of reference blocks for interprediction of the current block. The plurality of reference blocks may be selected from a single picture or a plurality of pictures that temporally precede or follow the current block.

The motion compensation unit 1020 then performs flexible weighted prediction using the selected reference blocks. The motion compensation unit 1020 interpredicts the current block based on the information about the weighting partition including the plurality of regions of the current block divided for interprediction and the information about weights set independently for each of the regions. In other words, the motion compensation unit 1020 divides the current block into a plurality of regions based on the information about the weighting partition extracted by the decoding unit 1010 and assigns the weights set independently for each of the regions to the reference blocks, thereby performing weighted prediction on the current block.

The reconstruction unit 1030 reconstructs the current block based on a prediction block generated by the prediction of the motion compensation unit 1020 and the residual block decoded by the decoding unit 1010. More specifically, the reconstruction unit 1030 adds the prediction block to the residual block, thereby reconstructing the current block.

The reconstructed current block is stored in the picture memory 1040 for use in prediction of a next block or a next picture.

Figure 11:
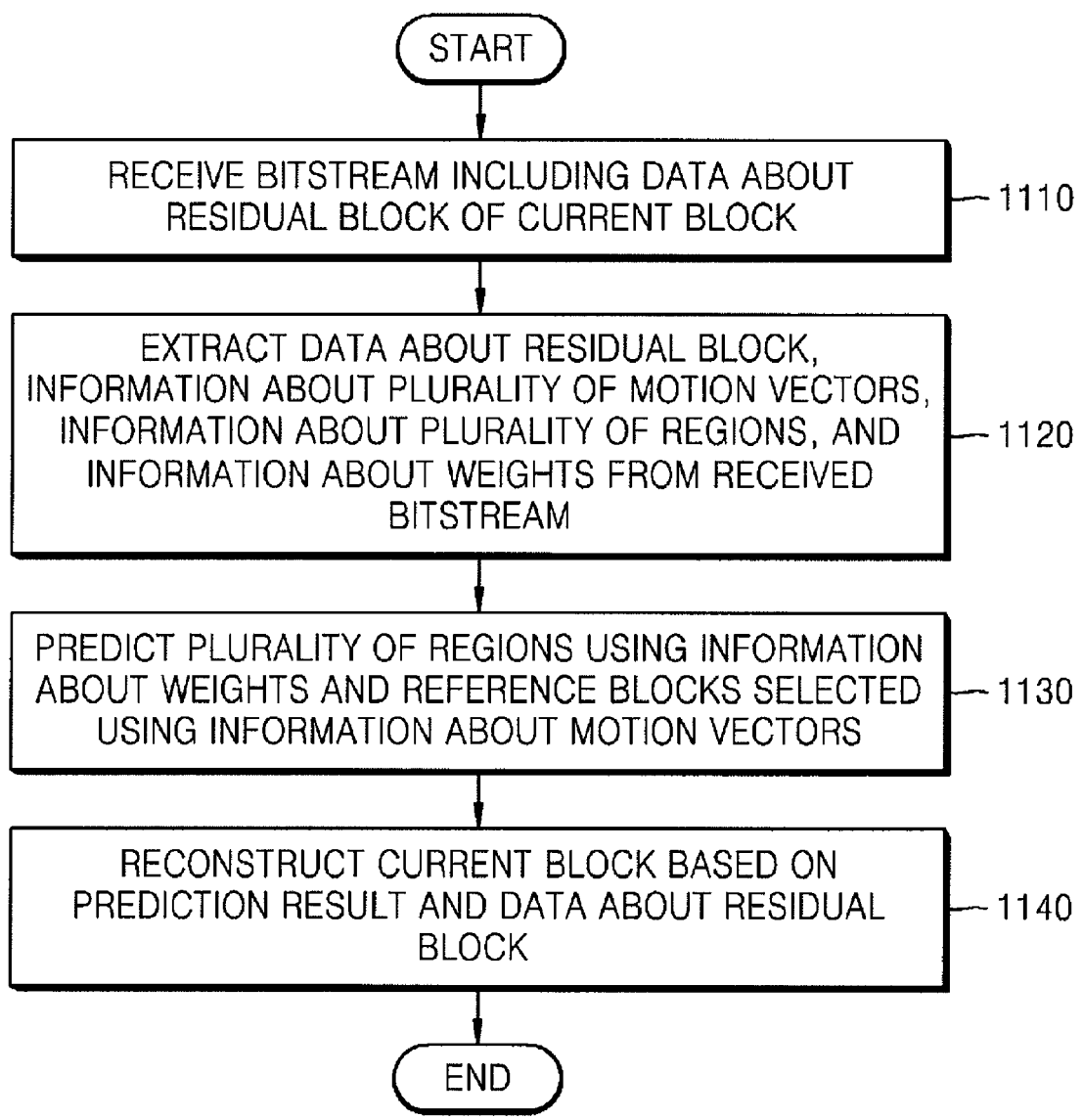
FIG. 11 is a flowchart of a video decoding method according to an exemplary embodiment of the present invention.

FIG. 11 is a flowchart of a video decoding method according to an exemplary embodiment of the present invention.

Referring to FIG. 11, a video decoding apparatus receives a bitstream including data about a residual block of a current block in operation 1110.

In operation 1120, the video decoding apparatus extracts the data about the residual block, information about a plurality of motion vectors required for prediction of the current block, information about a weighting partition including a plurality of regions for weighted prediction of the current block, and information about weights set independently for each of the regions from the bitstream received in operation 1110. The video decoding apparatus reconstructs the data about the residual block by performing entropy decoding, inverse quantization, and inverse DCT.

In operation 1130, the video decoding apparatus interpredicts the current block based on the information extracted in operation 1120. More specifically, the video decoding apparatus selects a plurality of reference blocks required for interprediction of the current block based on the extracted information about the plurality of motion vectors and performs weighted prediction by setting weights assigned to the plurality of reference blocks independently for each of the regions.

In operation 1140, the video decoding apparatus reconstructs the current block based on a prediction block generated by the prediction of operation 1130 and the residual block reconstructed in operation 1120. More specifically, the video decoding apparatus reconstructs the current block by adding the prediction block to the residual block.

As described above, according to the exemplary embodiments of the present invention, a current block can be accurately interpredicted during video encoding and decoding, thereby improving the compression rate of video encoding.

Moreover, regions obtained by dividing the current block can be predicted using different weight combinations, thereby making flexible weighted prediction possible.

Meanwhile, the exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A video decoding method comprising:
   receiving a bitstream comprising data about a residual block of a current block;
   extracting the data about the residual block, information about a plurality of motion vectors for interprediction of the current block, information about a plurality of regions obtained by dividing the current block for the interprediction, and information about weights set independently for each of the regions from the received bitstream;
   predicting the plurality of regions using the information about the weights and a plurality of reference blocks selected based on the information about the plurality of motion vectors; and
   reconstructing the current block based on a result of the prediction and the data about the residual block.

2. The video decoding method of claim 1, wherein the plurality of motion vectors are motion vectors for a plurality of sub-blocks included in the current block, and each of the reference blocks and the current block have a same size.

3. The video decoding apparatus of claim 1, wherein the plurality of motion vectors are motion vectors for bi-predictive prediction of the current block, and each of the reference blocks and the current block have a same size.

4. A video decoding apparatus comprising:
   a decoding unit which receives a bitstream comprising data about a residual block of a current block and extracts the data about the residual block, information about a plurality of motion vectors for interprediction of the current block, information about a plurality of regions obtained by dividing the current block for the interprediction, and information about weights set independently for each of the regions from the received bitstream;
   a motion compensation unit which predicts the plurality of regions using the information about the weights and a plurality of reference blocks selected based on the information about the plurality of motion vectors, to generate a prediction result; and
   a reconstruction unit which reconstructs the current block based on the prediction result and the data about the residual block.

5. The video decoding apparatus of claim 1, wherein the plurality of motion vectors are motion vectors for a plurality of sub-blocks included in the current block, and each of the reference blocks and the current block have a same size.

6. The video decoding apparatus of claim 1, wherein the plurality of motion vectors are motion vectors for bi-predictive prediction of the current block, and each of the reference blocks and the current block.

* * * * *